(12) United States Patent
Tsay et al.

(10) Patent No.: US 8,622,732 B2
(45) Date of Patent: Jan. 7, 2014

(54) MULTI-ROD MECHANISM FOR OPENING AND CLOSING MOLDS

(75) Inventors: Der-min Tsay, Kaohsiung (TW); Hsin-pao Chen, Kaohsiung (TW); Shih-han Chen, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 255 days.

(21) Appl. No.: 13/020,010

(22) Filed: Feb. 2, 2011

(65) Prior Publication Data
US 2011/0287121 A1    Nov. 24, 2011

(30) Foreign Application Priority Data
May 21, 2010    (TW) ................................ 99116304 A (51) Int. Cl.
*B29C 49/56*    (2006.01)
(52) U.S. Cl.
USPC ................ 425/451.4; 425/451.5; 425/161
(58) Field of Classification Search
CPC ............................ B29C 49/56; B29C 33/22
USPC .................... 425/161, 451.4, 451.5
See application file for complete search history.

(56) References Cited

U.S. PATENT DOCUMENTS

| | | | |
|---|---|---|---|
| 4,878,828 A | 11/1989 | Wollschlager et al. | |
| 5,551,862 A * | 9/1996 | Allred, Jr. ..................... | 425/532 |

FOREIGN PATENT DOCUMENTS

| | | |
|---|---|---|
| TW | M326468 | 2/2008 |
| TW | M333294 U | 6/2008 |
| TW | I317322 B | 11/2009 |
| TW | M390865 U1 | 10/2010 |

* cited by examiner

*Primary Examiner* — Yogendra Gupta
*Assistant Examiner* — Alison Hindenlang
(74) *Attorney, Agent, or Firm* — Cheng-Ju Chiang (57) ABSTRACT

A multi-rod mechanism for opening and closing molds is provided and includes a single cam, a first side connection rod assembly located on a first side of the cam, a first mold actuated by the first side connection rod assembly, a linkage connection rod, a second side connection rod assembly located on a second side of the cam and actuated by the linkage connection rod, and a second mold actuated by the second side connection rod assembly. The multi-rod mechanism only uses the single cam to simultaneously actuate the first and second molds, so that the structure of the multi-rod mechanism can be simplified, while the vibration, loading, noise and abrasion of components during operation can be relatively reduced.

11 Claims, 5 Drawing Sheets

MULTI-ROD MECHANISM FOR OPENING AND CLOSING MOLDS

FIELD OF THE INVENTION

The present invention relates to a multi-rod mechanism for opening and closing molds, and more particularly to a multi-rod mechanism for opening and closing molds, which is used to simplify the structure of the multi-rod mechanism, reduce the abrasion of a cam and elongate the lifetime of the cam.

BACKGROUND OF THE INVENTION

Nowadays, bottle blow-molding machines are widely applied to fabrications of various plastic bottles (such as PET bottles). A traditional bottle blow-molding machine comprises various different mechanical parts, such as a mechanism for opening and closing molds, a mechanism for feeding material and blowing bottles, a mechanism for ejecting bottles, a mechanism for conveying and etc., wherein the mechanism for opening and closing molds can be designed and driven by selectively using various different power sources (such as motor, pneumatic cylinder, hydraulic cylinder or cam).

For example, Taiwan Utility Model Patent No. M326468 discloses a "Mechanism for Opening and Closing Molds of Bottle Blow-Molding Machine", wherein a machine base of a bottle blow-molding machine is provided with two opposite mold bases which can horizontally slide back and forth, and each of the mold bases is linked to the machine base through a toggle assembly. Each of the two toggle assemblies is pivotally connected to a first connection rod assembly which is driven by a first cam and a second cam of a cam assembly, respectively. Thus, the two mold bases can be simultaneously driven to be opened or closed. Furthermore, a lower mold base which can longitudinally slide back and forth is linked to a second connection rod assembly which is driven by a third cam of the cam assembly. Thus, the lower mold base can be simultaneously driven to be opened or closed.

However, there are some problems existing in the actual use of the traditional mechanism for opening and closing molds, as follows: during opening or closing the mold bases, a downward push force fed back from the mold bases and connection rods of the first connection rod assemblies will directly abut against each of the cam surfaces on the cam assembly. After the cam surfaces are long-term used and worn, the precision of the first connection rod assemblies for pushing the two mold bases to close will be affected. In other words, when closing the mold bases, a gap may exist between two contact surfaces of the two mold bases, so as to affect the yield of subsequently feeding material and blowing bottles. Moreover, because the downward push force from the connection rods of the first connection rod assemblies during opening the mold bases will directly abut against each of the cam surfaces on the cam assembly, the cam assembly needs a greater rotation power to push the connection rods of the first connection rod assemblies for opening the mold bases. Meanwhile, the excess push loading transmitted through the connection rods may cause the bending of the connection rods or the pivotal vibrations, noise or abrasion on various pivotal points. In addition, for simultaneously driving the two first connection rod assemblies and the second connection rod assembly, the cam assembly must have three types of different cams, and thus the purchase cost of the cam assembly will be increased. Besides, if installation angles between the three cams are changed, the mold opening and closing operations of the two mold bases and the lower mold base will be affected and can not coordinate with each other, resulting in affecting the yield of subsequently feeding material and blowing bottles. Furthermore, the cam assembly belongs to one of components having higher cost, so that the abrasion of the cam assembly will cause higher maintenance and replacement cost.

As a result, it is necessary to provide a multi-rod mechanism for opening and closing molds to solve the problems existing in the conventional technologies, as described above.

SUMMARY OF THE INVENTION

A primary object of the present invention is to provide a multi-rod mechanism for opening and closing molds, wherein a first mold at a first side of a cam is actuated by a first side connection rod assembly, while a second side connection rod assembly and a second mold at a second side of the cam are actuated by a linkage connection rod. The multi-rod mechanism only uses the single cam to simultaneously actuate the first and second molds, so that the structure of the multi-rod mechanism can be simplified; the vibration, loading, noise and abrasion of components during operation can be relatively reduced; the operational speed and productivity of the multi-rod mechanism can be enhanced; the lifetime of the multi-rod mechanism can be elongated; and the maintenance and replacement rate of the multi-rod mechanism can be lowered.

A secondary object of the present invention is to provide a multi-rod mechanism for opening and closing molds, wherein a plurality of connection rods of a connection rod assembly are arranged along a common vertical line in the mold opening operation (or the mold closing operation), while a horizontal extension line defined by a cam follower and a following connection rod is substantially vertical to the vertical line. Thus, during the mold opening operation (or the mold closing operation), it can prevent a downward push force fed back from the reciprocally longitudinal swing of the connection rod assembly from completely focusing on and transmitting to a cam follower and a cam. In other words, the abrasion problem of the cam due to tightly abutment between the cam follower and a cam surface will be relatively reduced. Thus, it is advantageous to reduce the abrasion of the cam surface, elongate the lifetime of the cam, ensure the precision of mold closing operation, and increase the yield of bottle blow-molding.

To achieve the above object, the present invention provides a multi-rod mechanism for opening and closing molds, which comprises: a cam rotating to generate a driving power; a cam follower actuated by the cam to linearly move back and forth; a first side connection rod assembly actuated by the cam follower to swing; a first mold actuated by the first side connection rod assembly to linearly move back and forth; a linkage connection rod actuated by the first side connection rod assembly to swing; a second side connection rod assembly actuated by the linkage connection rod to swing; and a second mold actuated by the second side connection rod assembly to linearly move back and forth; wherein the second mold cooperates with the corresponding first mold which linearly moves back and forth opposite to the second mold, so that the second mold is close to or away from the first mold for carrying out a mold closing operation or a mold opening operation.

In one embodiment of the present invention, the first side connection rod assembly comprises a quadruple joint connection rod, a first push connection rod, a first support connection rod and a first mold connection rod; and wherein the quadruple joint connection rod is actuated by the cam follower to pivotally rotate, so that the first push connection rod then longitudinally pushes (or pulls) the first support connection rod and the first mold connection rod which thus actuates the first mold to carry out the mold opening operation (or the mold closing operation).

In one embodiment of the present invention, the quadruple joint connection rod has a pivotal fulcrum, a following pivotal point, a linkage pivotal point and a push pivotal point; and wherein the pivotal fulcrum is pivotally connected to a first pivotal base, the following pivotal point is pivotally connected to the cam follower, the linkage pivotal point is pivotally connected to the linkage connection rod, and the push pivotal point is pivotally connected to the first push connection rod.

In one embodiment of the present invention, the cam follower has a following connection rod to be pivotally connected to the following pivotal point of the quadruple joint connection rod.

In one embodiment of the present invention, the first push connection rod and the push pivotal point, the pivotal fulcrum and the linkage pivotal point of the quadruple joint connection rod are longitudinally arranged along a common first vertical line in the mold opening operation (or the mold closing operation).

In one embodiment of the present invention, a horizontal extension line defined by the cam follower and the following connection rod is substantially vertical to the first vertical line.

In one embodiment of the present invention, the second side connection rod assembly comprises a triple joint connection rod, a second push connection rod, a second support connection rod and a second mold connection rod; and wherein the triple joint connection rod is actuated by the linkage connection rod to pivotally rotate, so that the second push connection rod then longitudinally pushes (or pulls) the second support connection rod and the second mold connection rod which thus actuates the second mold to carry out the mold opening operation (or the mold closing operation).

In one embodiment of the present invention, the triple joint connection rod has a pivotal fulcrum, a linkage pivotal point and a push pivotal point; and wherein the pivotal fulcrum is pivotally connected to a second pivotal base, the linkage pivotal point is pivotally connected to the linkage connection rod, and the push pivotal point is pivotally connected to the second push connection rod.

In one embodiment of the present invention, the second push connection rod and the push pivotal point and the pivotal fulcrum of the triple joint connection rod are arranged along a common second vertical line in the mold opening operation (or the mold closing operation).

In one embodiment of the present invention, the multi-rod mechanism is a mechanism for opening and closing molds of a bottle blow-molding machine.

In one embodiment of the present invention, the first side connection rod assembly further comprises a first sliding connection rod pivotally connected between the quadruple joint connection rod and the first push connection rod.

In one embodiment of the present invention, the second side connection rod assembly further comprises a second sliding connection rod pivotally connected the triple joint connection rod and the second push connection rod.

In one embodiment of the present invention, the first side connection rod assembly comprises a triple joint connection rod, a first push connection rod, a first support connection rod and a first mold connection rod; and wherein the triple joint connection rod is actuated by the cam follower to pivotally rotate, so that the first push connection rod then pushes or pulls the first support connection rod and the first mold connection rod.

In one embodiment of the present invention, the triple joint connection rod has a pivotal fulcrum, a following pivotal point and a push pivotal point; and wherein the pivotal fulcrum is pivotally connected to a first pivotal base, the following pivotal point is pivotally connected to the cam follower, and the push pivotal point is pivotally connected to the first push connection rod and the linkage connection rod, respectively.

In one embodiment of the present invention, the cam follower has a following connection rod to be pivotally connected to the following pivotal point of the triple joint connection rod; the first push connection rod and the push pivotal point and the pivotal fulcrum of the triple joint connection rod are arranged along a common first vertical line in the mold opening operation (or the mold closing operation); and a horizontal extension line defined by the cam follower and the following connection rod is vertical to the first vertical line.

In one embodiment of the present invention, the first side connection rod assembly further comprises a first sliding connection rod pivotally connected between the triple joint connection rod and the first push connection rod.

In one embodiment of the present invention, the second side connection rod assembly comprises a double joint connection rod, a second push connection rod, a second support connection rod and a second mold connection rod; and wherein the double joint connection rod is actuated by the linkage connection rod to pivotally rotate, so that the second push connection rod then pushes or pulls the second support connection rod and the second mold connection rod.

In one embodiment of the present invention, the double joint connection rod has a pivotal fulcrum and a push pivotal point; and wherein the pivotal fulcrum is pivotally connected to a second pivotal base, and the push pivotal point is pivotally connected to the second push connection rod and the linkage connection rod, respectively.

In one embodiment of the present invention, the second push connection rod and the push pivotal point and the pivotal fulcrum of the double joint connection rod are arranged along a common second vertical line in the mold opening operation (or the mold closing operation).

In one embodiment of the present invention, the second side connection rod assembly further comprises a second sliding connection rod pivotally connected the double joint connection rod and the second push connection rod.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings.

Figure 1:
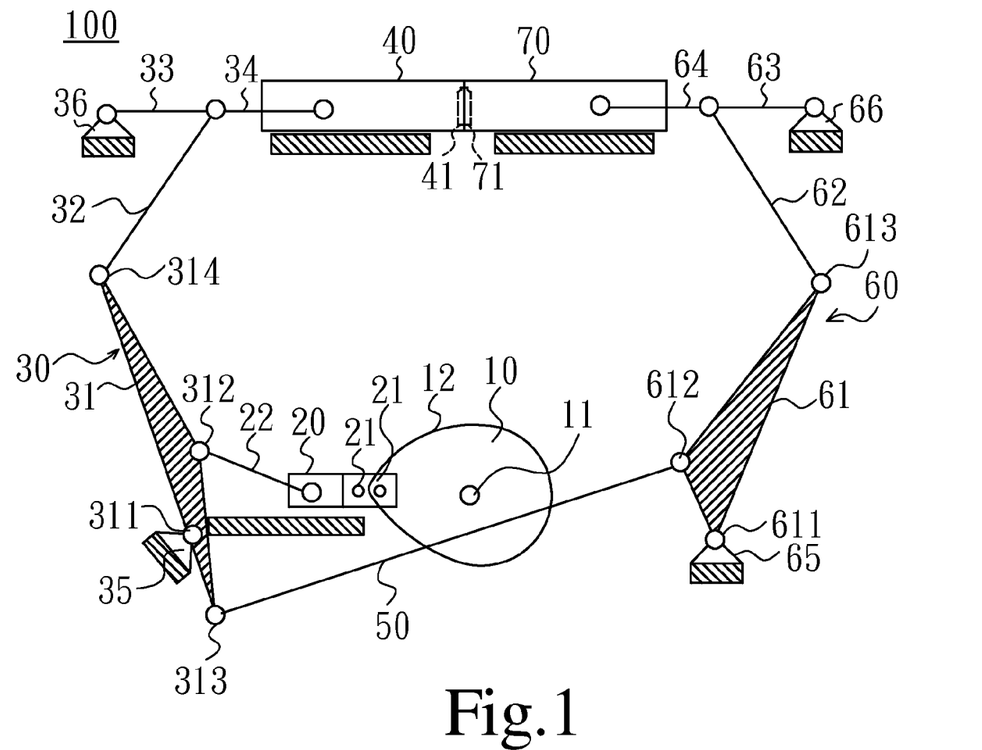
FIG. 1 is a schematic view of a mold closing operation of a multi-rod mechanism for opening and closing molds according to a first embodiment of the present invention.
Figure 2:
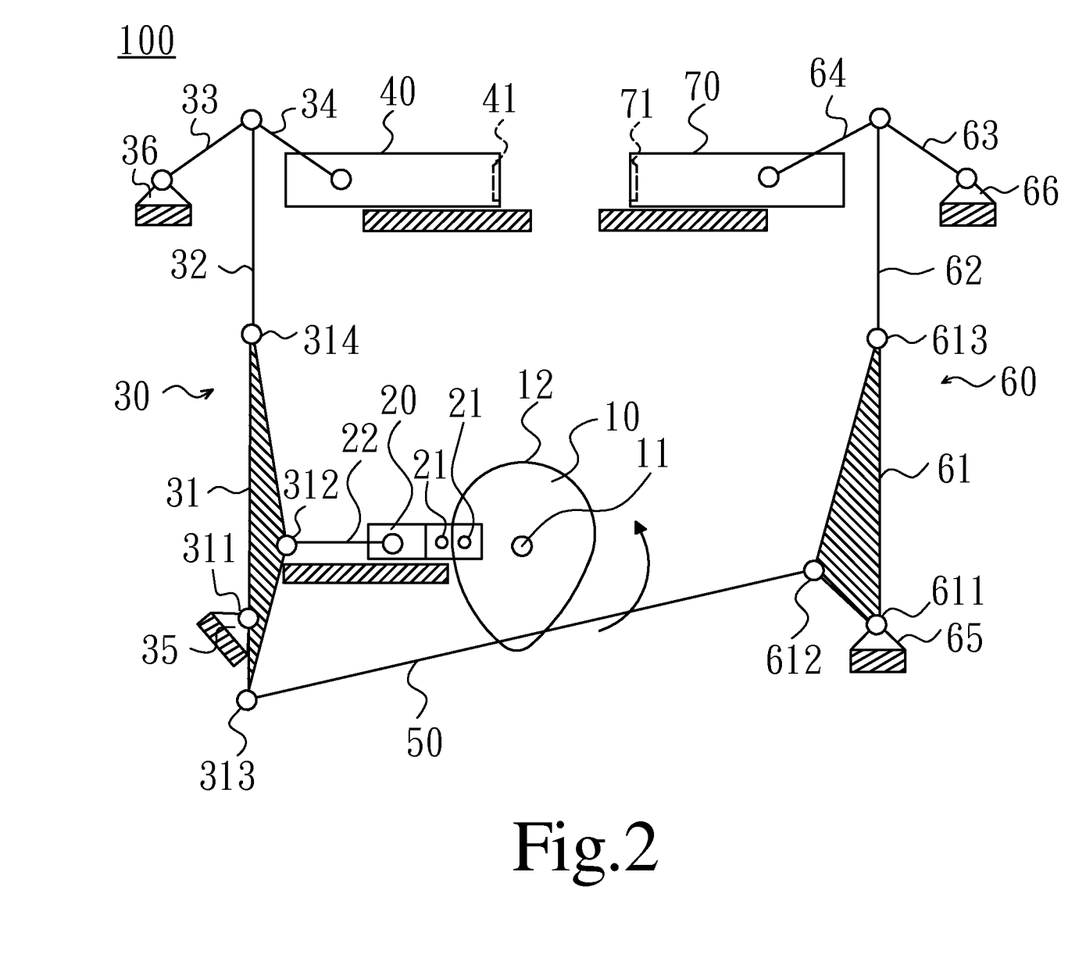
FIG. 2 is a schematic view of a mold opening operation of the multi-rod mechanism for opening and closing molds according to the first embodiment of the present invention.

Referring now to FIGS. 1 and 2, a first embodiment of the present invention discloses a multi-rod mechanism for opening and closing molds 100 which is mainly applied to a bottle blow-molding machine for mass production of various plastic bottles, such as PET (polyethylene terephthalate) bottles and etc. As shown in FIG. 1, the mechanism for opening and closing molds 100 comprises: a cam 10, a cam follower 20, a first side connection rod assembly 30, a first mold 40, a linkage connection rod 50, a second side connection rod assembly 60 and a second mold 70.

In the present invention, it should be noted that the term "pivotal connection" described hereinafter is used to define that a connection relationship between a first component and a second component is a pivotal connection relationship, wherein the first component can rotate within a predetermined angle in relation to the second component. Meanwhile, the term "connection rod" is used to define that a rod-like or polygonal component has at least two pivotal points for being pivotally connected to another component (such as a connection rod, a mold or a follower), a pivotal base and etc. Furthermore, various directional terms described by the present invention, such as upper, lower, front, back, left, right, inner, outer, longitudinal, transverse, vertical, horizontal, side and etc., are only directions based on structures in the accompanying drawings.

For example, the terms "first side" and "second side" described in the present invention hereinafter are used to define the relative positions of a left side and a right side of the cam 10 in each of the accompanying drawings, i.e. a left side close to the first mold 40 and a right side close to the second mold 70, respectively, wherein the terms "first side" and "second side" or the foregoing other directional terms are only used to describe and understand the installation relationship of related components of the present invention, but the present invention is not limited thereto.

Figure 1A:
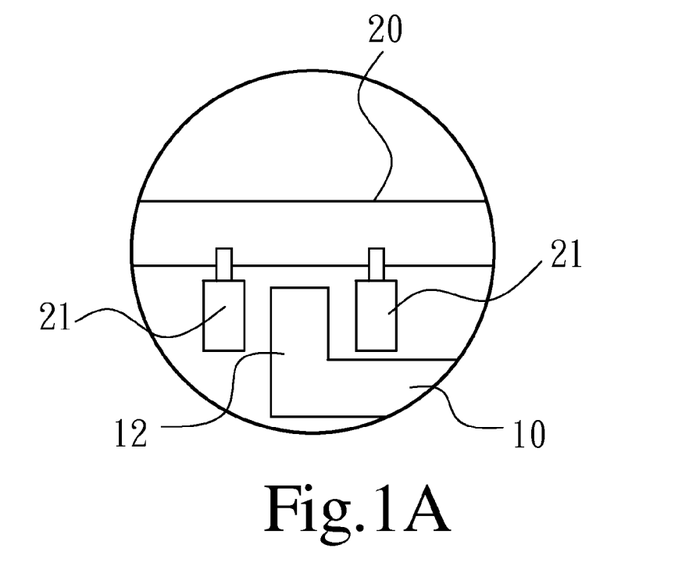
FIG. 1A is a partially enlarged cross-sectional view of FIG. 1 according to the first embodiment of the present invention.

Referring now to FIGS. 1 and 1A, in the first embodiment of the present invention, the cam 10 is made of wear-resistant metal or alloy material, and the cam 10 is mounted on a shaft 11, wherein the shaft 11 is actuated by an external power source (such as a driving motor), so as to rotate and thus generate a driving power. The cam 10 can be an integral one-piece cam or an assembled multi-piece cam. According to the configuration, the cam 10 can be a rib cam, a grooved cam, a planar cam or any other type of equivalent cam. The number of the cam 10 is preferably one, but also can be two or more. Furthermore, in the embodiment, the cam follower 20 is a slide block which can be actuated by the cam 10 to linearly and transversely move back and forth along a track (unlabeled) on a machine base of the mechanism for opening and closing molds 100.

As shown in the partially enlarged cross-sectional view of FIG. 1A, the cam 10 is preferably a rib cam which has a cross-section preferably having a shallow dish profile for providing a flange 12, wherein inner and outer surfaces of the flange 12 has a predetermined non-circular cam profile. The cam follower 20 preferably has a pair of rollers 21 to commonly clamp the flange 21 of the cam 10. Thus, when the cam 10 rotates, the cam 10 can actuate the cam follower 20 to linearly move back and forth along the track. Furthermore, the cam follower 20 further comprises a following connection rod 22, wherein the following connection rod 22 has a first end pivotally connected to a pivotal point (unlabeled) of the cam follower 20 and a second end used for actuating the first side connection rod assembly 30 to swing (i.e. pivotally rotate within a predetermined angle).

Referring now to FIGS. 1 and 2, in the first embodiment of the present invention, the first side connection rod assembly 30 comprises a quadruple joint connection rod 31, a first push connection rod 32, a first support connection rod 33 and a first mold connection rod 34; and wherein the quadruple joint connection rod 31 is actuated by the cam follower 20 to pivotally rotate, so that the first push connection rod 32 then longitudinally pushes (or pulls) the first support connection rod 33 and the first mold connection rod 34 which thus actuates the first mold 40 to carry out the mold opening operation (or the mold closing operation).

For more details, in the embodiment, the quadruple joint connection rod 31 is a substantially triangular plate or a connection rod assembly constructed by a plurality of components, wherein the quadruple joint connection rod 31 has a pivotal fulcrum 311, a following pivotal point 312, a linkage pivotal point 313 and a push pivotal point 314; wherein the linkage pivotal point 313, the pivotal fulcrum 311 and a push pivotal point 314 are located at the same side of the triangular plate in turn, while the following pivotal point 312, the linkage pivotal point 313 and the push pivotal point 314 are preferably located at three corners of the triangular plate, but the relative positions of the foregoing points are not limited thereto. The pivotal fulcrum 311 is pivotally connected to a first pivotal base 35, and the following pivotal point 312 is pivotally connected to the following connection rod 22 of the cam follower 20. Thus, the following connection rod 22 can push (or pull) the quadruple joint connection rod 31 to pivotally rotate within a predetermined angle (such as an optional angle between 15 degree and 60 degree) in relation to the pivotal fulcrum 311 and the first pivotal base 35.

Moreover, the linkage pivotal point 313 is pivotally connected to the linkage connection rod 50 for actuating the linkage connection rod 50 to swing. The push pivotal point 314 is pivotally connected to the first push connection rod 32 for actuating the first push connection rod 32 to push upward (or pull downward). In addition, a first end of the first support connection rod 33 is pivotally connected to a first support base 36, and a second thereof is pivotally connected to a first end of the first mold connection rod 34, wherein a second end of the first mold connection rod 34 is pivotally connected to the first mold 40.

Referring now to FIGS. 1 and 2, in the first embodiment of the present invention, the first mold 40 has a first mold cavity 41 having a cavity profile designed according to specifications of to-be-blow-molded plastic bottles. The first mold 40 is pivotally connected to the second end of the first mold connection rod 34. As shown in FIG. 1, when the first support connection rod 33 and the first mold connection rod 34 are pulled downward by the quadruple joint connection rod 31 and the first push connection rod 32, the first support connection rod 33 and the first mold connection rod 34 are transversely disposed at a common horizontal extension line, wherein the first mold connection rod 34 actuates the first mold 40 to horizontally and transversely move to carry out a mold closing operation.

On the other hand, referring now to FIG. 2, when the first support connection rod 33 and the first mold connection rod 34 are pushed upward by the quadruple joint connection rod 31 and the first push connection rod 32, the first support connection rod 33 and the first mold connection rod 34 are pivotally rotated in relation to each other at a predetermined angle which may be greater than, equal to or smaller than 90 degree. Thus, the first mold connection rod 34 actuates the first mold 40 to horizontally and transversely move to carry out a mold opening operation. In the mold opening operation, the first push connection rod 32 and the push pivotal point 314, the pivotal fulcrum 311 and the linkage pivotal point 313 of the quadruple joint connection rod 31 are preferably longitudinally arranged along a common first vertical line in turn. Meanwhile, a horizontal extension line defined by the cam 10, the cam follower 20 and the following connection rod 22 is substantially or closely vertical to the first vertical line.

Thus, during the mold opening/closing operation, the foregoing design can disperse a downward push force fed back from the reciprocally longitudinal swing of the first side connection rod assembly 30 toward the first pivotal base 35 and the first support base 36, so as to prevent from excessively and transversely transmitting to the following connection rod 22, the cam follower 20 and the cam 10 along the horizontal extension line. In other words, the abrasion problem of the cam 10 due to tightly abutment between the rollers 21 of the cam follower 20 and the inner and outer surfaces on the flange 12 of the cam 10 will be relatively reduced. Thus, it is advantageous to elongate the lifetime of the cam 10, ensure the precision of mold closing operation, and increase the yield of bottle blow-molding.

Referring now to FIGS. 1 and 2, in the first embodiment of the present invention, the linkage connection rod 50 is substantially disposed below the cam 10, the first side connection rod assembly 30 and the second side connection rod assembly 60. The linkage connection rod 50 has a first end pivotally connected to the linkage pivotal point 313 of the quadruple joint connection rod 31 of the first side connection rod assembly 30, and a second end pivotally connected to the second side connection rod assembly 60. The linkage connection rod 50 is actuated by the quadruple joint connection rod 31 of the first side connection rod assembly 30 to swing for driving the second side connection rod assembly 60 to correspondingly swing.

Referring now to FIGS. 1 and 2, in the first embodiment of the present invention, the second side connection rod assembly 60 comprises a triple joint connection rod 61, a second push connection rod 62, a second support connection rod 63 and a second mold connection rod 64; and wherein the triple joint connection rod 61 is actuated by the linkage connection rod 50 to pivotally rotate, so that the second push connection rod 62 then longitudinally pushes (or pulls) the second support connection rod 63 and the second mold connection rod 64 which thus actuates the second mold 70 to carry out the mold opening operation (or the mold closing operation).

For more details, in the embodiment, the triple joint connection rod 61 is a substantially triangular plate or a connection rod assembly constructed by a plurality of components, wherein the triple joint connection rod 61 has a pivotal fulcrum 611, a linkage pivotal point 612 and a push pivotal point 613, all of which are preferably located at three corners of the triangular plate. Furthermore, the pivotal fulcrum 611 is pivotally connected to a second pivotal base 65, and the linkage pivotal point 612 is pivotally connected to the linkage connection rod 50. Thus, the linkage connection rod 50 can push (or pull) the triple joint connection rod 61 to pivotally rotate within a predetermined angle (such as an optional angle between 15 degree and 60 degree without limitation) in relation to the pivotal fulcrum 611 and the second pivotal base 65. The push pivotal point 613 is pivotally connected to the second push connection rod 62 for actuating the second push connection rod 62 to push upward (or pull downward). In addition, a first end of the second support connection rod 63 is pivotally connected to a second support base 66, and a second thereof is pivotally connected to a first end of the second mold connection rod 64, wherein a second end of the second mold connection rod 64 is pivotally connected to the second mold 70.

Referring now to FIGS. 1 and 2, in the first embodiment of the present invention, the second mold 70 has a second mold cavity 71 having a cavity profile designed according to specifications of to-be-blow-molded plastic bottles. The second mold cavity 71 is corresponding to the first mold cavity 41 of the first mold 40, and the second mold 70 is pivotally connected to the second end of the second mold connection rod 64. As shown in FIG. 1, when the second support connection rod 63 and the second mold connection rod 64 are pulled downward by the triple joint connection rod 61 and the second push connection rod 62, the second support connection rod 63 and the second mold connection rod 64 are transversely disposed at a common horizontal extension line, wherein the second mold connection rod 64 actuates the second mold 70 to horizontally and transversely move to carry out a mold closing operation.

On the other hand, referring now to FIG. 2, when the second support connection rod 63 and the second mold connection rod 64 are pushed upward by the triple joint connection rod 61 and the second push connection rod 62, the second support connection rod 63 and the second mold connection rod 64 are pivotally rotated in relation to each other at a predetermined angle which may be greater than, equal to or smaller than 90 degree. Thus, the second mold connection rod 64 actuates the second mold 70 to horizontally and transversely move to carry out a mold opening operation. In the mold opening operation, the second push connection rod 62 and the push pivotal point 613 and the pivotal fulcrum 611 of the triple joint connection rod 61 are preferably longitudinally arranged along a common second vertical line in turn. Meanwhile, a rod extension line defined by the linkage connection rod 50 and the second vertical line have an included angle defined therebetween, wherein the included angle is close to 90 degree.

Thus, during the mold opening/closing operation, the foregoing design can disperse a downward push force fed back from the reciprocally longitudinal swing of the second side connection rod assembly 60 toward the second pivotal base 65 and the second support base 66, so as to prevent from excessively and transversely transmitting to the linkage connection rod 50 and the first side connection rod assembly 30 along the extension line of the linkage connection rod 50. In other words, the abrasion problem of the inner and outer surfaces on the flange 12 of the cam 10 will be relatively reduced. Thus, it is advantageous to elongate the lifetime of the cam 10, ensure the precision of mold closing operation, and increase the yield of bottle blow-molding.

Referring now to FIGS. 1 and 2, according to the multi-rod mechanism for opening and closing molds 100 in the first embodiment of the present invention, the first mold 40 at the first side of the cam 10 is actuated by the first side connection rod assembly 30, while the second side connection rod assembly 60 and the second mold 70 at the second side of the cam are actuated by the linkage connection rod 50. The foregoing multi-rod mechanism only uses the single cam 10 to simultaneously actuate the first and second molds 40, 70, so that the structure of the cam 10 can be simplified; the vibration, loading, noise and abrasion of components during operation can be relatively reduced; the operational speed and productivity of the multi-rod mechanism can be enhanced; the lifetime of the multi-rod mechanism can be elongated; and the maintenance and replacement rate of the multi-rod mechanism can be lowered.

Figure 3:
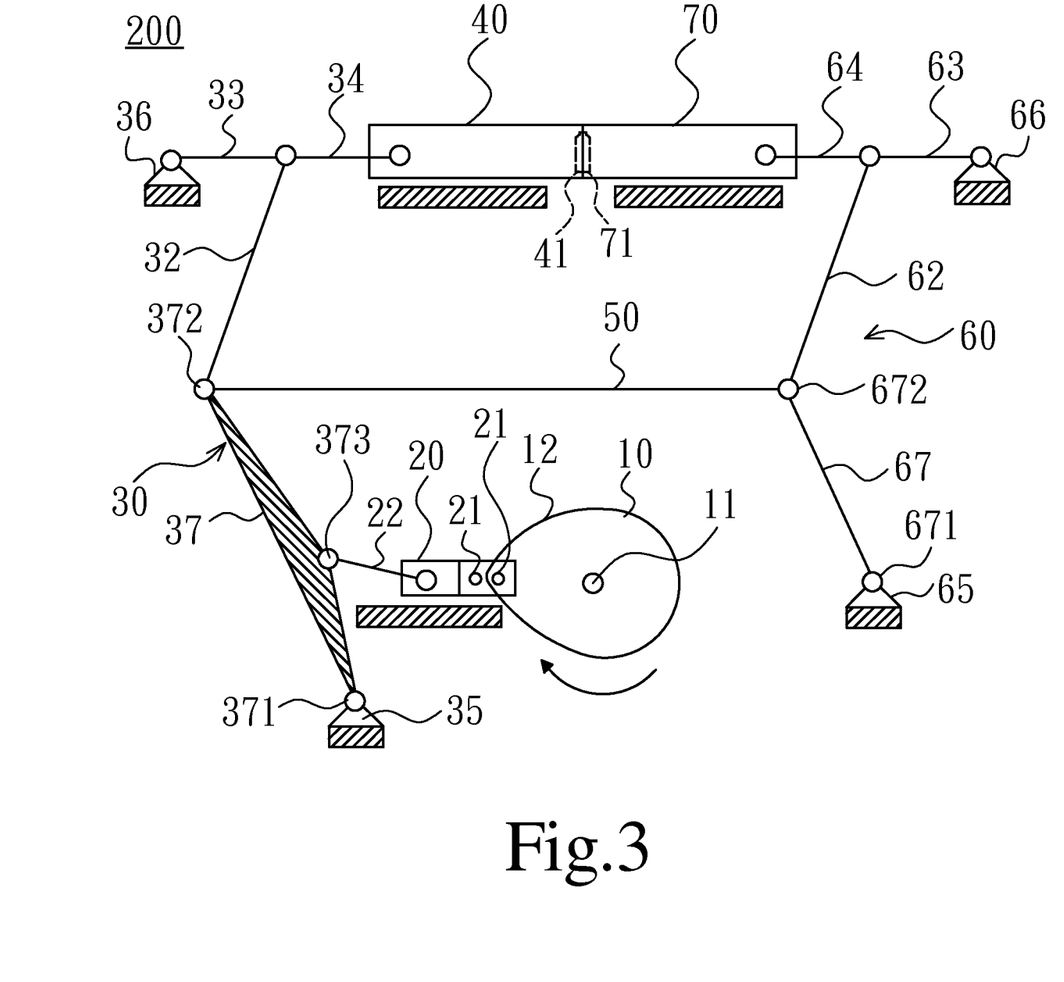
FIG. 3 is a schematic view of a mold closing operation of a multi-rod mechanism for opening and closing molds according to a second embodiment of the present invention.

Referring now to FIG. 3, a multi-rod mechanism for opening and closing molds according to a second embodiment of the present invention is illustrated and similar to the first embodiment, so that the second embodiment uses similar terms and numerals of the first embodiment. As shown, the difference of the second embodiment is that: a multi-rod mechanism for opening and closing molds 200 of the second embodiment comprises a first side connection rod assembly 30 which uses a triple joint connection rod 37 to replace the quadruple joint connection rod 31, and a second side connection rod assembly 60 which uses a double joint connection rod 67 to replace the triple joint connection rod 61.

For more details, the triple joint connection rod 37 has a pivotal fulcrum 371, a push pivotal point 372 and a following pivotal point 373 for being pivotally connected to the first pivotal base 35, the first push connection rod 32 and the following connection rod 22, respectively. A first end of the following connection rod 22 is pivotally connected to a pivotal point (unlabeled) of the cam follower 20, and a second end thereof is pivotally connected to the following pivotal point 373 for actuating the first side connection rod assembly 30 to swing. Furthermore, the double joint connection rod 67 has a pivotal fulcrum 671 and a push pivotal point 672 for being pivotally connected to the second pivotal base 65 and the second push connection rod 62, respectively. Moreover, the linkage connection rod 50 is disposed above the cam 10 and the cam follower 20 and disposed below the first mold 40 and the second mold 70. Two ends of the linkage connection rod 50 is pivotally connected to the push pivotal point 372 and the push pivotal point 672, so that the first side connection rod assembly 30 can smoothly actuate the second side connection rod assembly 60 to swing.

As shown in FIG. 3, in the second embodiment, when the first support connection rod 33 and the first mold connection rod 34 are pulled downward by the triple joint connection rod 37 and the first push connection rod 32, the first support connection rod 33 and the first mold connection rod 34 are transversely disposed at a common horizontal extension line, wherein the first mold connection rod 34 actuates the first mold 40 to carry out a mold closing operation. Meanwhile, the second support connection rod 63 and the second mold connection rod 64 are pulled downward by the double joint connection rod 67 and the second push connection rod 62, the second support connection rod 63 and the second mold connection rod 64 are transversely disposed at a common horizontal extension line, wherein the second mold connection rod 64 actuates the second mold 70 to carry out a mold closing operation.

On the other hand, when the first support connection rod 33 and the first mold connection rod 34 are pushed upward by the triple joint connection rod 37 and the first push connection rod 32, the second support connection rod 63 and the second mold connection rod 64 are pushed upward by the double joint connection rod 67 and the second push connection rod 62. At this time, the first support connection rod 33 and the first mold connection rod 34 are pivotally rotated in relation to each other at a predetermined angle greater than 90 degree, so that the first mold connection rod 34 actuates the first mold 40 to carry out a mold opening operation (not-shown). Meanwhile, the second support connection rod 63 and the second mold connection rod 64 are pivotally rotated in relation to each other at a predetermined angle greater than 90 degree, so that the second mold connection rod 64 actuates the second mold 70 to carry out a mold opening operation.

In the mold opening operation, the first push connection rod 32 and the push pivotal point 372 and the pivotal fulcrum 371 of the triple joint connection rod 37 are preferably longitudinally arranged along a common first vertical line (not-shown) in turn. Meanwhile, a horizontal extension line (not-shown) defined by the cam 10, the cam follower 20 and the following connection rod 22 is substantially or closely vertical to the first vertical line. Thus, during the mold opening/closing operation, the foregoing design can disperse a downward push force fed back from the reciprocally longitudinal swing of the first side connection rod assembly 30 toward the first pivotal base 35 and the first support base 36, so as to prevent from excessively and transversely transmitting to the triple joint connection rod 37, the following connection rod 22, the cam follower 20 and the cam 10 along the horizontal extension line. In other words, the abrasion problem of the cam 10 due to tightly abutment between the rollers 21 of the cam follower 20 and the inner and outer surfaces on the flange 12 of the cam 10 will be relatively reduced. Thus, it is advantageous to elongate the lifetime of the cam 10, ensure the precision of mold closing operation, and increase the yield of bottle blow-molding.

Furthermore, in the mold opening operation, the second push connection rod 62 and the push pivotal point 672 and the pivotal fulcrum 671 of the double joint connection rod 67 are preferably longitudinally arranged along a common second vertical line (not-shown) in turn. Meanwhile, a rod extension line (not-shown) defined by the linkage connection rod 50 and the second vertical line have an included angle defined therebetween, wherein the included angle is close to 90 degree. Thus, during the mold opening/closing operation, the foregoing design can disperse a downward push force fed back from the reciprocally longitudinal swing of the second side connection rod assembly 60 toward the second pivotal base 65 and the second support base 66, so as to prevent from excessively and transversely transmitting to the linkage connection rod 50 and the first side connection rod assembly 30 along the extension line of the linkage connection rod 50. In other words, the abrasion problem of the inner and outer surfaces on the flange 12 of the cam 10 will be relatively reduced. Thus, it is advantageous to elongate the lifetime of the cam 10, ensure the precision of mold closing operation, and increase the yield of bottle blow-molding.

Figure 4:
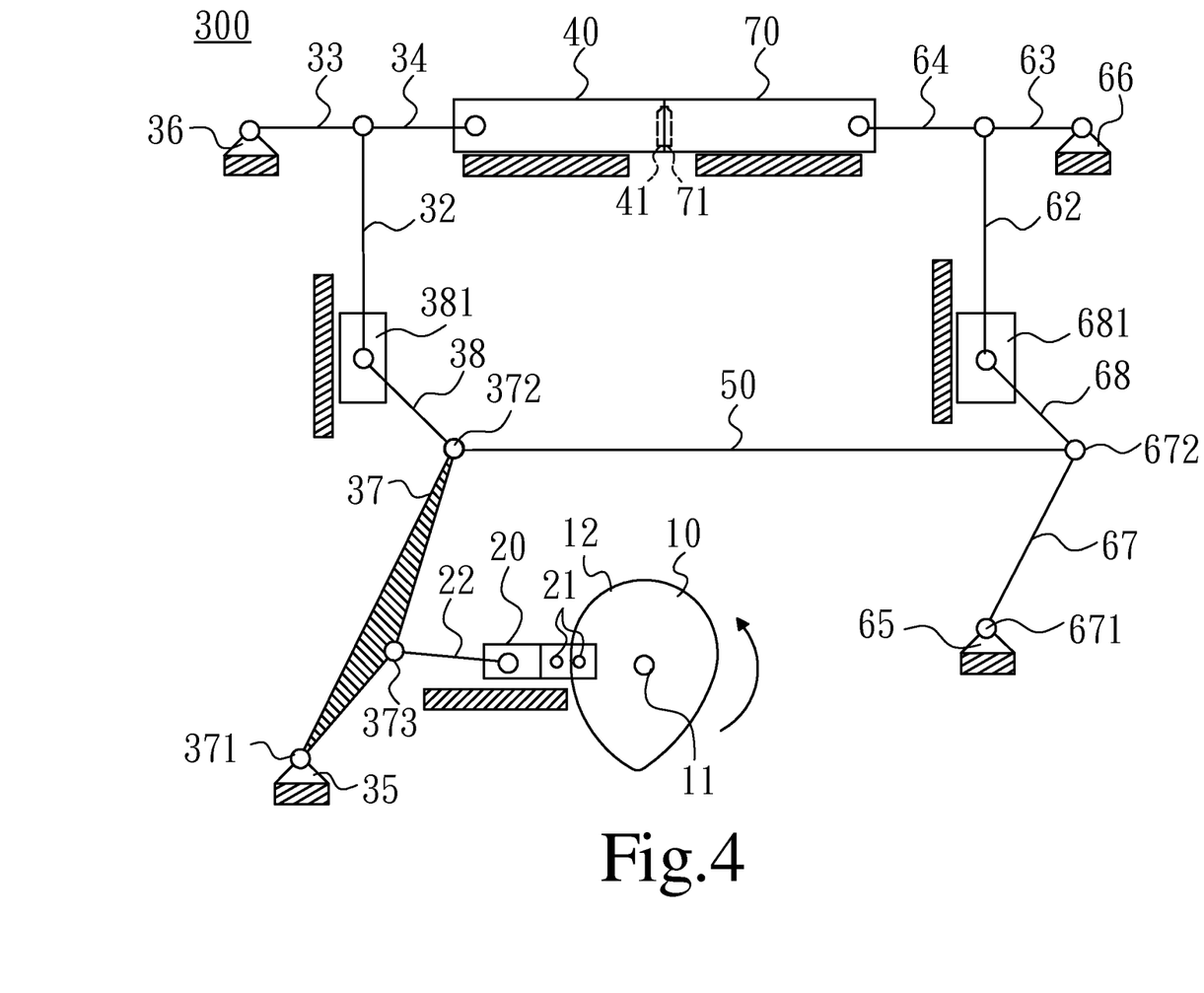
FIG. 4 is a schematic view of a mold closing operation of a multi-rod mechanism for opening and closing molds according to a third embodiment of the present invention.

Referring now to FIG. 4, a multi-rod mechanism for opening and closing molds according to a third embodiment of the present invention is illustrated and similar to the second embodiment, so that the third embodiment uses similar terms and numerals of the second embodiment. As shown, the difference of the third embodiment is that: the first side connection rod assembly 30 of a multi-rod mechanism for opening and closing molds 300 of the third embodiment further comprises a first sliding connection rod 38 pivotally connected between the triple joint connection rod 37 and the first push connection rod 32, while the second side connection rod assembly 60 further comprises a second sliding connection rod 68 pivotally connected the double joint connection rod 67 and the second push connection rod 62.

For more details, a first end of the first sliding connection rod 38 is pivotally connected to the push pivotal point 372 of the triple joint connection rod 37, and a second end thereof is pivotally connected to the first push connection rod 32 through a first push slider 381, wherein the first push slider 381 can longitudinally move back and forth along a track (unlabeled) on the machine base of the mechanism for opening and closing molds 300. Furthermore, a first end of the second sliding connection rod 68 is pivotally connected to the push pivotal point 672 of the double joint connection rod 67, and a second end thereof is pivotally connected to the second push connection rod 62 through a second push slider 681, wherein the second push slider 681 can longitudinally move back and forth along a track (unlabeled) on the machine base of the mechanism for opening and closing molds 300.

As shown in FIG. 4, in the third embodiment, when the first support connection rod 33 and the first mold connection rod 34 are pulled downward by the triple joint connection rod 37, the first sliding connection rod 38 and the first push connection rod 32, the first support connection rod 33 and the first mold connection rod 34 are transversely disposed at a common horizontal extension line, wherein the first mold connection rod 34 actuates the first mold 40 to carry out a mold closing operation. Meanwhile, the second support connection rod 63 and the second mold connection rod 64 are pulled downward by the double joint connection rod 67, the second sliding connection rod 68 and the second push connection rod 62, the second support connection rod 63 and the second mold connection rod 64 are transversely disposed at a common horizontal extension line, wherein the second mold connection rod 64 actuates the second mold 70 to carry out a mold closing operation.

On the other hand, when the first support connection rod 33 and the first mold connection rod 34 are pushed upward by the triple joint connection rod 37, the first sliding connection rod 38 and the first push connection rod 32, the first support connection rod 33 and the first mold connection rod 34 are pivotally rotated in relation to each other at a predetermined angle greater than 90 degree, so that the first mold connection rod 34 actuates the first mold 40 to carry out a mold opening operation (not-shown). Meanwhile, the second support connection rod 63 and the second mold connection rod 64 are pushed upward by the double joint connection rod 67, the second sliding connection rod 68 and the second push connection rod 62, and then the second support connection rod 63 and the second mold connection rod 64 are pivotally rotated in relation to each other at a predetermined angle greater than 90 degree, so that the second mold connection rod 64 actuates the second mold 70 to carry out a mold opening operation.

In the mold opening operation, the first push connection rod 32, the first sliding connection rod 38 and the push pivotal point 372 and the pivotal fulcrum 371 of the triple joint connection rod 37 are preferably longitudinally arranged along a common first vertical line (not-shown) in turn. Meanwhile, a horizontal extension line (not-shown) defined by the cam 10, the cam follower 20 and the following connection rod 22 is substantially or closely vertical to the first vertical line. Thus, during the mold opening/closing operation, the foregoing design can disperse a downward push force fed back from the reciprocally longitudinal swing of the first side connection rod assembly 30 toward the first pivotal base 35 and the first support base 36, so as to prevent from excessively and transversely transmitting to the triple joint connection rod 37, the following connection rod 22, the cam follower 20 and the cam 10 along the horizontal extension line. In other words, the abrasion problem of the cam 10 due to tightly abutment between the rollers 21 of the cam follower 20 and the inner and outer surfaces on the flange 12 of the cam 10 will be relatively reduced. Thus, it is advantageous to elongate the lifetime of the cam 10, ensure the precision of mold closing operation, and increase the yield of bottle blow-molding.

Furthermore, in the mold opening operation, the second push connection rod 62, the second sliding connection rod 68 and the push pivotal point 672 and the pivotal fulcrum 671 of the double joint connection rod 67 are preferably longitudinally arranged along a common second vertical line (not-shown) in turn. Meanwhile, a rod extension line (not-shown) defined by the linkage connection rod 50 and the second vertical line have an included angle defined therebetween, wherein the included angle is close to 90 degree. Thus, during the mold opening/closing operation, the foregoing design can disperse a downward push force fed back from the reciprocally longitudinal swing of the second side connection rod assembly 60 toward the second pivotal base 65 and the second support base 66, so as to prevent from excessively and transversely transmitting to the linkage connection rod 50 and the first side connection rod assembly 30 along the extension line of the linkage connection rod 50. In other words, the abrasion problem of the inner and outer surfaces on the flange 12 of the cam 10 will be relatively reduced. Thus, it is advantageous to elongate the lifetime of the cam 10, ensure the precision of mold closing operation, and increase the yield of bottle blow-molding.

Figure 5:
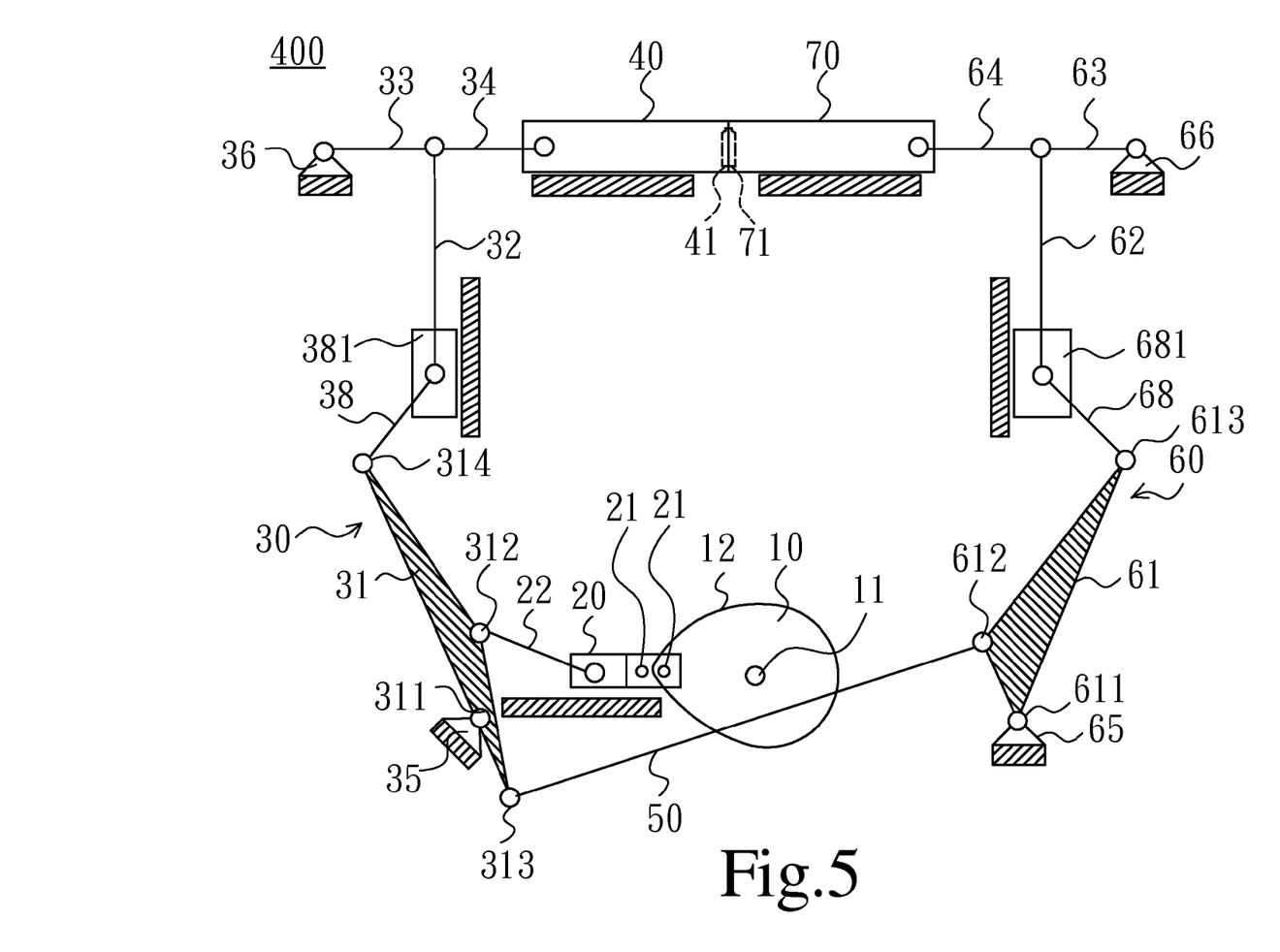
FIG. 5 is a schematic view of a mold closing operation of a multi-rod mechanism for opening and closing molds according to a fourth embodiment of the present invention.

Referring now to FIG. 5, a multi-rod mechanism for opening and closing molds according to a fourth embodiment of the present invention is illustrated and similar to the first and third embodiments, so that the fourth embodiment uses similar terms and numerals of the first and third embodiments. As shown, the difference of the fourth embodiment is that: a multi-rod mechanism for opening and closing molds 400 of the fourth embodiment is constructed by a portion of components of the first embodiment and a portion of components of the third embodiment, wherein the multi-rod mechanism for opening and closing molds 400 comprises: a cam 10, a cam follower 20, a first side connection rod assembly 30, a first mold 40, a linkage connection rod 50, a second side connection rod assembly 60 and a second mold 70, wherein the cam 10 has a shaft 11 and a flange 12; the cam follower 20 has a pair of rollers 21 and a following connection rod 22; the first side connection rod assembly 30 has a quadruple joint connection rod 31, a first push connection rod 32, a first support connection rod 33, a first mold connection rod 34, a first pivotal base 35, a first support base 36, a first sliding connection rod 38 and a first push slider 381, wherein the quadruple joint connection rod 31 has a pivotal fulcrum 311, a following pivotal point 312, a linkage pivotal point 313 and a push pivotal point 314; the first mold 40 has a first mold cavity 41; the linkage connection rod 50 is linked between the first side connection rod assembly 30 and the second side connection rod assembly 60; the second side connection rod assembly 60 has a triple joint connection rod 61, a second push connection rod 62, a second support connection rod 63, a second mold connection rod 64, a second pivotal base 65, a second support base 66, a second sliding connection rod 68 and a second push slider 681, wherein the triple joint connection rod 61 has a pivotal fulcrum 611, a linkage pivotal point 612 and a push pivotal point 613; and the second mold 70 has a second mold cavity 71.

In the fourth embodiment, the first side connection rod assembly 30 further comprises the first sliding connection rod 38 pivotally connected between the quadruple joint connection rod 31 and the first push connection rod 32, while the second side connection rod assembly 60 further comprises a second sliding connection rod 68 pivotally connected the triple joint connection rod 61 and the second push connection rod 62. Because the principle of the mold opening/closing operations of the multi-rod mechanism for opening and closing molds 400 in the fourth embodiment is similar to that of the multi-rod mechanism for opening and closing molds 100, 300 in the first and third embodiments, the detailed description of the fourth embodiment is thus omitted herein.

As described above, in comparison with the traditional mechanism for opening and closing molds which has too many cam surfaces and each of the cam surfaces easily lose the mold closing precision after long term use to affect the yield of subsequently feeding material and blowing bottles, the multi-rod mechanism for opening and closing molds 100 of the present invention as shown in FIGS. 1 to 5 is to actuate the first mold 40 at the first side of the cam 10 by the first side connection rod assembly 30 and to actuate the second side connection rod assembly 60 and the second mold 70 at the second side of the cam 10 by the linkage connection rod 50. The multi-rod mechanism only uses the single cam 10 to simultaneously actuate the first and second molds 40, 70, so that the structure of the multi-rod mechanism can be simplified; the vibration, loading, noise and abrasion of components during operation can be relatively reduced; the operational speed and productivity of the multi-rod mechanism can be enhanced; the lifetime of the multi-rod mechanism can be elongated; and the maintenance and replacement rate of the multi-rod mechanism can be lowered.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A multi-rod mechanism for opening and closing molds, comprising:
    a cam rotating to generate a driving power;
    a cam follower actuated by the cam to linearly move back and forth;
    a first side connection rod assembly actuated by the cam follower to swing;
    a first mold actuated by the first side connection rod assembly to linearly move back and forth;
    a linkage connection rod actuated by the first side connection rod assembly to swing;
    a second side connection rod assembly actuated by the linkage connection rod to swing, wherein the cam and the cam follower are disposed between the first side connection rod assembly and the second side connection rod assembly; and
    a second mold actuated by the second side connection rod assembly to linearly move back and forth;
    wherein the second mold cooperates with the corresponding first mold which linearly moves back and forth opposite to the second mold, so that the second mold is close to or away from the first mold for carrying out a mold closing operation or a mold opening operation;
    wherein the first side connection rod assembly comprises a quadruple joint connection rod, a first push connection rod, a first support connection rod and a first mold connection rod; and wherein the quadruple joint connection rod is actuated by the cam follower to pivotally rotate, so that the first push connection rod then pushes or pulls the first support connection rod and the first mold connection rod;
    wherein the quadruple joint connection rod has a pivotal fulcrum, a following pivotal point, a linkage pivotal point and a push pivotal point; and wherein the pivotal fulcrum is pivotally connected to a first pivotal base, the following pivotal point is pivotally connected to the cam follower, the linkage pivotal point is pivotally connected to the linkage connection rod, and the push pivotal point is pivotally connected to the first push connection rod; and
    wherein the cam follower has a following connection rod to be pivotally connected to the following pivotal point of the quadruple joint connection rod; the first push connection rod and the push pivotal point, the pivotal fulcrum and the linkage pivotal point of the quadruple joint connection rod are arranged along a common first vertical line in the mold opening operation or the mold closing operation; and a horizontal extension line defined by the cam follower and the following connection rod is vertical to the first vertical line.

2. The multi-rod mechanism for opening and closing molds according to claim 1, wherein the first side connection rod assembly further comprises a first sliding connection rod pivotally connected between the quadruple joint connection rod and the first push connection rod.

3. The multi-rod mechanism for opening and closing molds according to claim 1, wherein the second side connection rod assembly comprises a triple joint connection rod, a second push connection rod, a second support connection rod and a second mold connection rod; and wherein the triple joint connection rod is actuated by the linkage connection rod to pivotally rotate, so that the second push connection rod then pushes or pulls the second support connection rod and the second mold connection rod.

4. The multi-rod mechanism for opening and closing molds according to claim 3, wherein the triple joint connection rod has a pivotal fulcrum, a linkage pivotal point and a push pivotal point; and wherein the pivotal fulcrum is pivotally connected to a second pivotal base, the linkage pivotal point is pivotally connected to the linkage connection rod, and the push pivotal point is pivotally connected to the second push connection rod.

5. The multi-rod mechanism for opening and closing molds according to claim 4, wherein the second push connection rod and the push pivotal point and the pivotal fulcrum of the triple joint connection rod are arranged along a common second vertical line in the mold opening operation or the mold closing operation.

6. The multi-rod mechanism for opening and closing molds according to claim 1, wherein the multi-rod mechanism is a mechanism for opening and closing molds of a bottle blow-molding machine.

7. The multi-rod mechanism for opening and closing molds according to claim 3, wherein the second side connection rod assembly further comprises a second sliding connection rod pivotally connected the triple joint connection rod and the second push connection rod.

8. The multi-rod mechanism for opening and closing molds according to claim 1, wherein the second side connection rod assembly comprises a double joint connection rod, a second push connection rod, a second support connection rod and a second mold connection rod; and wherein the double joint connection rod is actuated by the linkage connection rod to pivotally rotate, so that the second push connection rod then pushes or pulls the second support connection rod and the second mold connection rod.

9. The multi-rod mechanism for opening and closing molds according to claim 8, wherein the double joint connection rod has a pivotal fulcrum and a push pivotal point; and wherein the pivotal fulcrum is pivotally connected to a second pivotal base, and the push pivotal point is pivotally connected to the second push connection rod and the linkage connection rod, respectively.

10. The multi-rod mechanism for opening and closing molds according to claim 9, wherein the second push connection rod and the push pivotal point and the pivotal fulcrum of the double joint connection rod are arranged along a common second vertical line in the mold opening operation or the mold closing operation.

11. The multi-rod mechanism for opening and closing molds according to claim 8, wherein the second side connection rod assembly further comprises a second sliding connection rod pivotally connected the double joint connection rod and the second push connection rod.

* * * * *